May 1, 1956 W. A. PRESCOTT 2,743,666
EGG COOKER
Filed Dec. 14, 1953

Inventor
William A. Prescott

United States Patent Office 2,743,666
Patented May 1, 1956

2,743,666
EGG COOKER

William Arthur Prescott, New Haven, Conn.

Application December 14, 1953, Serial No. 397,934

1 Claim. (Cl. 99—440)

An invention to hold egg (less its shell) for cooking and to prevent the egg from coming in contact with the cooking medium.

An object of this invention is to make it possible to visually inspect the condition of the egg before cooking.

Another object of this invention is to eliminate the undesirable condition of cooking eggs with a cracked shell.

Still another object of this invention is to eliminate the undesirable condition of avoiding loose egg shell particles when separating the cooked egg from its shell.

A further object of this invention is to allow the base to be used as an egg cup, if so desired, by removing the clamping means.

Figures 1, 4:
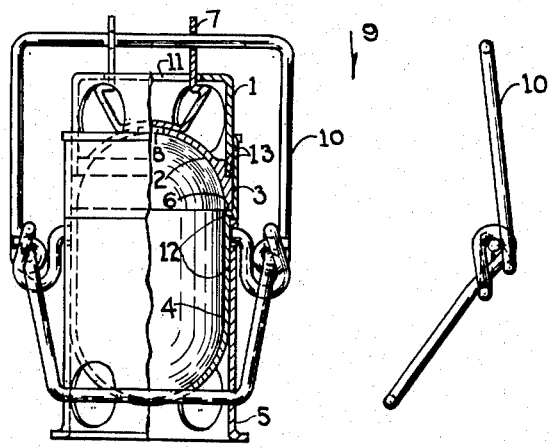

In the accompanying drawing, in which certain modes of carrying out the present invention are shown for illustrative purposes:

View Fig. 1 partially sectioned thru the center shows the assembly of the members and the vessel.

Figure 2:
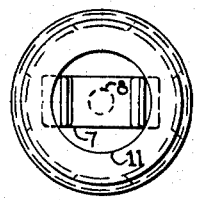

View Fig. 2 top of the vessel less the clamping means.

Figure 3:
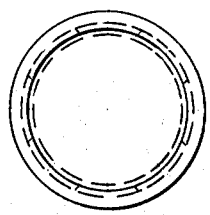

View Fig. 3 bottom of the vessel less the clamping means.

View Fig. 4 a side view of the clamping means only.

The invention is a circular vessel consisting of three members and a clamping means to form a completely enclosed container, combined in such a manner that assembled, the component parts can not be separated by jarring or pulling without manually manipulating a clamp member; therefore, the position of the egg cooker in the cooking medium is not restricted to vertical or upright but allowed to be placed on its side also.

Cover consisting of two formed members 1 and 2, which are fabricated together, to fit coaxially at outer surface of 1 and 2 as indicated by 3 within base consisting of two formed members 4 and 5 which are fabricated together, and have a contacting surface 6 the undermost lip of 2 with the said base at a shoulder formed in 4 by decreasing the interior size at a distance from the topmost surface of 4 such that the volume of egg which will be confined within the egg cooker, and placed initially within said base, will not spill over said topmost surface of 4, whereby the interior surface of the egg cooker, specifically parts 4 and 2, will be the surface that will contact the egg, and form the egg cooked therein to a smooth profile.

Spring 7 to close an escapement 8 in 2 after assembling said cover and base, whereby the egg within 4 will be displaced from the section immediately above said surface 6 to within interior of 2. In addition said spring 7 is used also to transfer a force 9 from an exterior clamping means 10 or similar device of design and function known to the art, and with enough flexibility to deflect the inward facing ends of the clamp away from the part 5, to disengage one from the other for separating the said cover from said base; conversely, for fastening one to the other to secure the said cover to the said base. Said spring which has sufficient elasticity to deflect when force is applied from said exterior clamp, whereby said force is transferred to 2 from the surface of spring 7 in contact with 2, in addition the spring is to be under tension when clamped and will have flexibility sufficient to clear opening 11 through the topmost surface of 1 in said cover for separating.

Said base will be made from two, 4 and 5, coaxial pieces securely fastened at 12 by brazing or other fabricating means.

Said cover will be made from two, 1 and 2, (more or less) separate coaxial pieces securely fastened at 13 by brazing or other fabricating means.

The material used in this invention will be of low coefficient of expansion, non-toxic, and have good drawing characteristics for forming.

Member 1 and 5 will have four (more or less) holes to assure equal distribution of heat.

It may also be mentioned that the fabrication herein referred to provides for easily forming the component parts to simplify fabrication.

I claim:

In an egg cooking and serving device the combination with a base member, of a bearing surface around the interior periphery and below the topmost extremity of the said base member, of an internal cylindrical portion in the said base member immediately above the said bearing surface, of a top member, of an exterior cylindrical surface on the said top member to fit within the said cylindrical portion of the base, of an interior portion of the said top member which opens to the bottom of the said top member, of an escapement to the said interior portion from the exterior of the said top member, of a spring member, conforming in shape to the exterior of the said top member for sealing the said escapement, and a clamp detachably arranged to the said base member and adapted to apply a force to the said spring member whereby all the members will be securely held together.

References Cited in the file of this patent
UNITED STATES PATENTS

| | | |
|---|---|---|
| 1,063,609 | Shaw et al. | June 3, 1913 |
| 1,353,278 | Schram | Sept. 21, 1920 |
| 1,459,129 | Wittig | June 19, 1923 |
| 2,226,844 | Carr | Dec. 31, 1940 |